United States Patent
Liu et al.

(10) Patent No.: US 11,501,404 B2
(45) Date of Patent: Nov. 15, 2022

(54) METHOD AND SYSTEM FOR DATA PROCESSING

(71) Applicant: Alibaba Group Holding Limited, George Town (KY)

(72) Inventors: Yongliang Liu, Hangzhou (CN); Jianyu Wang, Hangzhou (CN)

(73) Assignee: Alibaba Group Holding Limited

( * ) Notice: Subject to any disclaimer, the term of this patent is extended or adjusted under 35 U.S.C. 154(b) by 92 days.

(21) Appl. No.: 17/015,998

(22) Filed: Sep. 9, 2020

(65) Prior Publication Data
US 2021/0090204 A1 Mar. 25, 2021

(30) Foreign Application Priority Data

Sep. 23, 2019 (CN) .......................... 201910899739.3

(51) Int. Cl.
| | | |
|---|---|---|
| *G06T 1/00* | (2006.01) | |
| *G06T 7/13* | (2017.01) | |
| *G06T 7/00* | (2017.01) | |
| *G06T 5/50* | (2006.01) | |

(52) U.S. Cl.
CPC .............. *G06T 1/0021* (2013.01); *G06T 5/50* (2013.01); *G06T 7/13* (2017.01); *G06T 7/97* (2017.01)

(58) Field of Classification Search
CPC .... G06T 7/97; G06T 7/13; G06T 5/50; G06T 1/0021–60; G06T 2201/005–0601; H04N 1/32144–32352

See application file for complete search history.

(56) References Cited

U.S. PATENT DOCUMENTS

| | | | | |
|---|---|---|---|---|
| 6,600,828 B1 * | 7/2003 | Kawamura | ........... | G06T 1/0035 382/100 |
| 6,757,405 B1 * | 6/2004 | Muratani | .............. | G06T 1/0021 380/200 |
| 7,197,162 B2 * | 3/2007 | Murakami | ........... | G06T 1/0028 713/176 |
| 7,315,621 B2 * | 1/2008 | Noridomi | ............. | G06T 1/0085 380/54 |
| 7,555,139 B2 | 6/2009 | Rhoads | | |
| 7,769,197 B2 * | 8/2010 | Fujii | .................. | H04N 1/32208 380/54 |
| 9,311,687 B2 | 4/2016 | Reed | | |

(Continued)

FOREIGN PATENT DOCUMENTS

WO     WO-0143422 A1 *   6/2001   ........... G06T 1/0021

*Primary Examiner* — Shefali D Goradia

(74) *Attorney, Agent, or Firm* — Van Pelt, Yi & James LLP

(57) ABSTRACT

Data processing is disclosed including acquiring a first target image to be embedded with information and to-be-embedded information, acquiring, using the first target image, a second target image corresponding to the first target image, the second target image corresponding to an image including low-luminance pixels in the first target image, the low-luminance pixels being pixels having a luminance no higher than a luminance threshold value in the first target image, selecting candidate image areas from the second target image, determining a target embedding position for the to-be-embedded information in the first target image based on the candidate image areas, and embedding the to-be-embedded information in the target embedding position in the first target image.

18 Claims, 18 Drawing Sheets

(56) References Cited

U.S. PATENT DOCUMENTS

| | | | |
|---|---|---|---|
| 2007/0171288 A1* | 7/2007 | Inoue | G06T 3/00 |
| | | | 348/241 |
| 2008/0080009 A1* | 4/2008 | Masui | H04N 1/32229 |
| | | | 358/3.28 |
| 2016/0035059 A1 | 2/2016 | Rodriguez | |
| 2016/0275640 A1* | 9/2016 | Powers | G06T 1/0042 |

* cited by examiner

METHOD AND SYSTEM FOR DATA PROCESSING

CROSS REFERENCE TO OTHER APPLICATIONS

This application claims priority to People's Republic of China Patent Application No. 201910899739.3 entitled DATA PROCESSING METHOD, MEANS AND DEVICE filed Sep. 23, 2019 which is incorporated herein by reference for all purposes.

FIELD OF THE INVENTION

The present application relates to a method and a system for data processing.

BACKGROUND OF THE INVENTION

As digital media technology and Internet technology develop, importance of digital copyright protection of image, video, and other resources has been increasing.

Digital watermarking technology is typically used to protect digital copyrights. "Digital watermarking technology" typically refers to the use of concealed, embedded watermark information in image, video, and other resources used to provide copyright protection. As an aspect, when watermark information is embedded in an image, a video, or other resource, one technique for selecting the embedding position for the watermark information includes using a manually preset fixed strategy to select the embedding position. One technique specifies that a global pixel domain or frequency domain is selected or that a fixed local area is selected through a preset corresponding strategy or that the selection is made based on an area in an image, video, or other resource which underwent a certain pattern change. Another technique is to select the embedding position based on a manually preset local embedding strategy, e.g., fixedly select, based on an image or a video frame position, a certain position or a periodically changing embedding position.

Although the two above techniques can embed watermark information at a certain position in an image, the former of the above techniques typically requires adjustment calculations targeting the image or video frame of the to-be-embedded watermark information. These calculations are lengthy and relatively complex. The calculations take time to be performed and do not lend themselves to batch processing. Although the computations entailed in the second of the above two techniques can be decreased to a certain degree, the use of a manually preset embedding strategy to select the embedding position typically neglects the content characteristics of the image or video frames in which the watermark information is to be embedded. Therefore, the corresponding embedding strategy can easily be determined through analysis, and the embedded watermark information can then be removed from the image, the video, or the resource.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
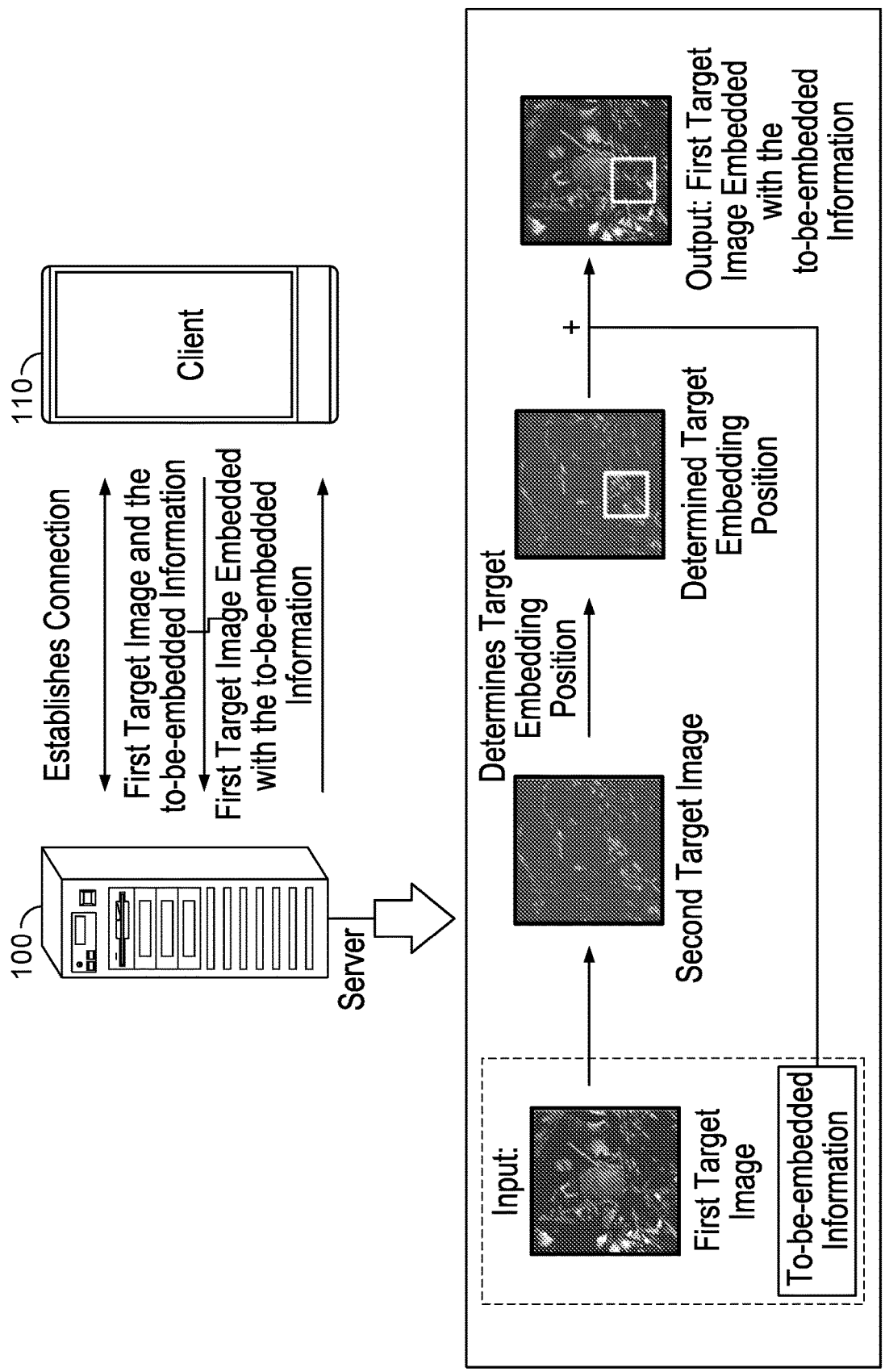
FIG. 1 is a diagram of an application scenario of an embodiment of a process for data processing.

Some embodiments provided by the present application may be applied to a client-server interaction scenario. FIG. 1 is a diagram of an application scenario of an embodiment of a process for data processing. First, a client 110 establishes a connection with a server 100. The connected client sends a first target image to be embedded with information and the to-be-embedded information to the server. After receiving the first target image and the to-be-embedded information, the server acquires, based on the first target image, a second target image corresponding to the first target image. In some embodiments, the second target image corresponds to an image including low-luminance pixels in the first target image. The low-luminance pixels correspond to pixels having a luminance no higher than a luminance threshold value in the first target image. Next, the server acquires candidate image areas from the second target image and determines a target embedding position for the to-be-embedded information in the first target image based on the candidate image areas. Next, the server embeds the to-be-embedded information in the target embedding position of the first target image and sends the first target image embedded with the to-be-embedded information to the client. The client then receives the first image with the embedded information.

In some embodiments, the client is a mobile terminal device, such as a mobile phone or a tablet, or the client is a common computer. In addition, when implemented, the process can be solely applied to a client or a server. For example, after acquiring the first target image and the to-be-embedded information, the client performs processing directly through a corresponding application installed on the client and then acquires the target image including the embedded information. Of course, the server can, after acquiring the first target image and the to-be-embedded information, directly store the processed first target image with the to-be-embedded information on itself or remotely without having to send the processed first target image with the to-be-embedded information to the client. The above application scenario is merely one particular embodiment of the process for processing data. The application scenario does not limit the process for processing data, but helps make the process for processing data easier to understand.

Figure 2A:
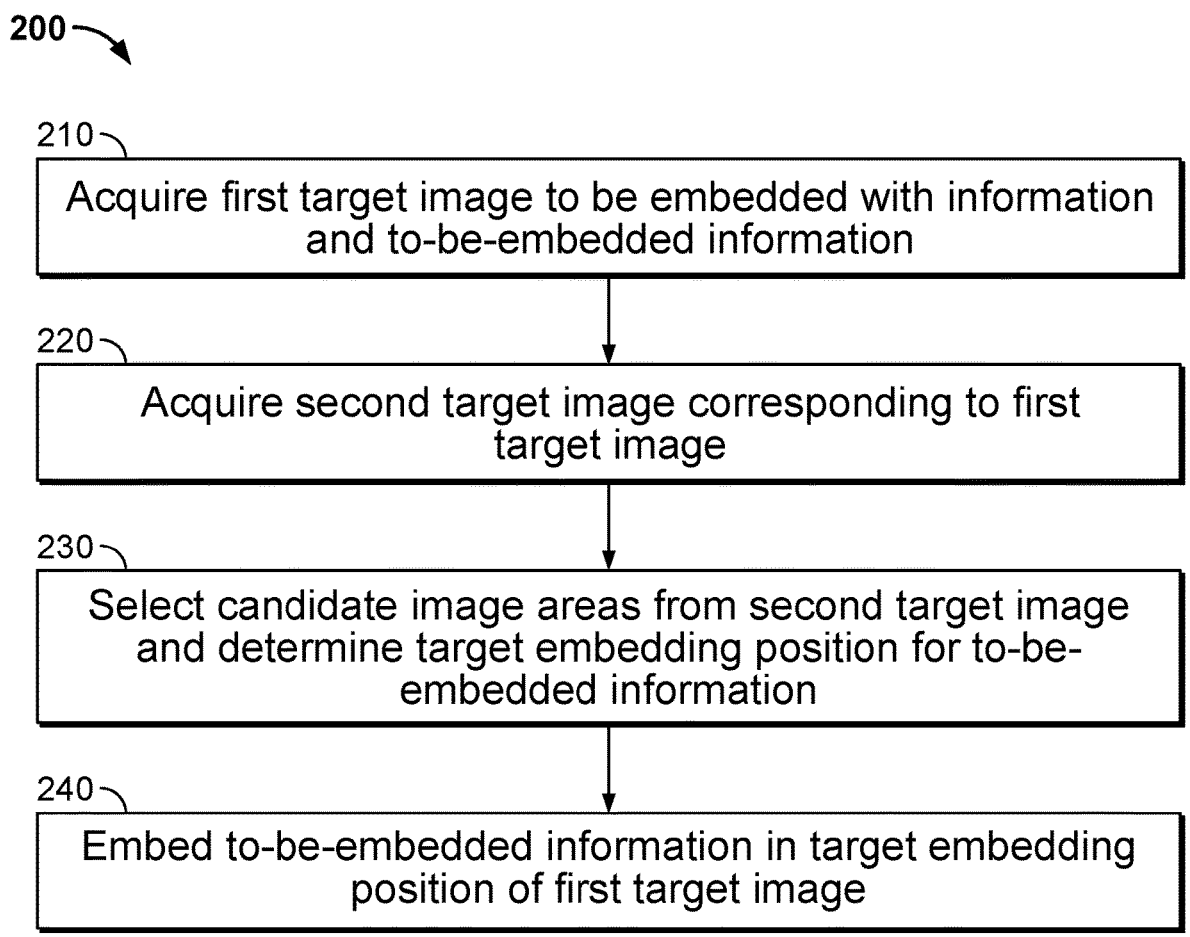
FIG. 2A is a flowchart of an embodiment of a process for data processing.

FIG. 2A is a flowchart of an embodiment of a process for data processing. In some embodiments, the process 200 is implemented by a server 100 of FIG. 1 and comprises:

In 210, the server acquires a first target image to be embedded with information and the to-be-embedded information.

In some embodiments, the first target image is a carrier for including the to-be-embedded information. In some embodiments, the first target image corresponds to an image or a video frame in a video resource.

The to-be-embedded information can be extra information that is added to the first target image. The extra information can have a specific meaning, and can be used to protect the copyright information of the first target image. An example of the extra information can be watermark information or other information to be covertly transmitted. To-be-embedded watermark information can be information such as a piece of text information or image information.

In 220, the server acquires, based on the first target image, a second target image corresponding to the first target image.

In some embodiments, the second target image is an image including low-luminance pixels in the first target image, and the low-luminance pixels correspond to pixels having a luminance no higher than a luminance threshold value in the first target image.

In some embodiments, the second target image is an image differentiated from the first target image. In some embodiments, the second target image is an image including low-luminance pixels in the first target image. In some embodiments, the low-luminance pixels include pixels having a luminance no higher than a luminance threshold value in the first target image.

Please note that examples of color models used in the image processing field to describe pixel colors in images include HSB (hue, saturation, brightness), RGB (red, green, blue), CMYK (cyan, magenta, yellow, black), and CIE L*a*b*. In the HSB color model, H corresponds to "hues," S corresponds to "saturation," and B corresponds to "brightness." In the RGB color model, R corresponds to "red," G corresponds to "green," and B corresponds to "blue." In some embodiments, luminance refers to a relevant luminance level of pixels in images. As an example, numerical values of the pixels can be obtained by subjecting the RGB numerical values of image pixels to color space transformation. In other words, by multiplying the RGB values of pixels in an image with a corresponding parameter matrix, luminance data for the pixels can be obtained. In some embodiments, in the event that the image is a grayscale image, luminance then refers to the grayscale values of the pixels. A higher grayscale value can indicate a higher pixel luminance. In some embodiments, pixel luminance is measured using grayscale values. Please note that the grayscale value refers to the color depth of pixels in a black-and-white image. In some embodiments, the range for pixel luminance is from 0 to 255, with white being 255 and black being 0. The parameter matrix can be a YCbCr 3*3 matrix. In some embodiments, YCbCr is one kind of color space, which is generally used in continuous image processing in films or in digital photography systems. Y corresponds to the luma component, Cb corresponds to the blue-difference chroma component, and Cr corresponds to the red-difference chroma component. The processing entailed in acquiring image luminance values is understood by one of ordinary skill in the art and will not be further discussed for conciseness.

In some embodiments, the determining of the target embedding position for to-be-embedded information in a first target image includes: the first target image undergoes processing to acquire a second target image that corresponds to the first target image and includes pixels from the first target image having a luminance no higher than a luminance threshold value; and the target embedding position for the to-be-embedded information in the first target image is determined based on the second target image. The determining of the target embedding position for to-be-embedded information in the first target image is to be explained below.

In some embodiments, the luminance threshold value refers to mean pixel luminance in the first target image multiplied by a coefficient of 0.8. In other words, the sum of the luminance of all the pixels in the first target image is multiplied by 0.8 to give a specific value for the luminance threshold value. In some embodiments, the coefficient can be set to another value.

The acquiring of the second target image corresponding to the first target image based on the first target image can be as follows: First, a luminance information image that corresponds to the first target image and has pixel luminance information is acquired. Then pixels having a luminance higher than a luminance threshold value are discarded from the luminance information image to acquire a low-luminance information image corresponding to the luminance information image. Next, a second target image corresponding to the first target image is acquired based on the first target image and the low-luminance information image.

In some embodiments, the luminance information image corresponds to an image that includes specific luminance information, i.e., luminance values, of pixels in an image. The luminance information image can also be a luminance image corresponding to the first target image or a grayscale image corresponding to the first target image. In some embodiments, the luminance information image is obtained through color space transformation. In other words, the luminance information image can be obtained by multiplying, for example, the RGB values of pixels in the first target image with a corresponding parameter matrix. Since obtaining the luminance information image by multiplying the RGB values of pixels in the first target image with a corresponding parameter matrix is understood by one of ordinary skill in the art, a further explanation is omitted for conciseness.

After the luminance information image corresponding to the first target image is obtained, pixels having a luminance higher than a luminance threshold value in the luminance information image are discarded to obtain a low-luminance information image corresponding to the luminance information image.

The discarding of pixels having a luminance higher than a luminance threshold value from the luminance information image can include the following: first, luminance information image pixels having an original luminance greater than a luminance threshold value are acquired. Next, the pixel luminance is set to an initial value, i.e., the pixel luminance values which are higher than a luminance threshold value are replaced with luminance values that are not higher than the luminance threshold value. For example, the initial value is set to 0. In another example the initial value is set to the luminance threshold value. In yet another example, the initial value is set to 0, 0.3, 0.5, or any value that is not higher than the luminance threshold value. Other techniques for discarding pixels having a luminance higher than the luminance threshold value from a luminance information image can be used and will not further discussed for conciseness.

After the low-luminance information image corresponding to the luminance information image is obtained, a second target image corresponding to the first target image can be obtained based on the first target image and the low-luminance information image. The obtaining of the second target image includes matching image data in the low-luminance information image against image data in the first target image, and discarding pixels which failed to match from the first target image to obtain a low-luminance target image. The low-luminance target image can correspond to the first target image.

In some embodiments, the target embedding position for to-be-embedded information in the first target image is acquired based on the obtained second target image corresponding to the first target image. Please note that the second target image is a low-luminance binary edge image corresponding to the first target image. In some embodiments, the second target image is another image corresponding to the first target image.

Figure 2B:
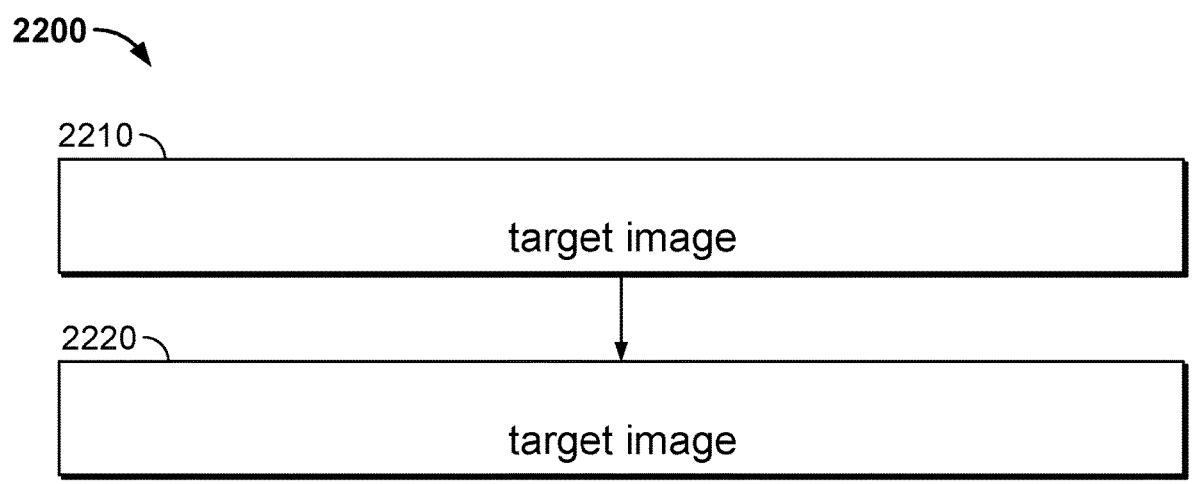
FIG. 2B is a flowchart of an embodiment of a process for acquiring a second target image corresponding to a first target image.

FIG. 2B is a flowchart of an embodiment of a process for acquiring a second target image corresponding to a first target image. In some embodiments, the process 2200 is an implementation of operation 220 of FIG. 2A and includes:

In 2210, the server acquires a binary edge image corresponding to the first target image. In some embodiments, the binary edge image is a binary image including an overall texture edge information of the first target image. In some embodiments, the overall texture edge information corresponds to the edge information of the image.

First, to increase the processing speed of the first target image and to boost the image effect of the first target image under different ratios, the first target image undergoes preprocessing before the low-luminance binary edge image corresponding to the first target image is obtained. The result is a preprocessed target image corresponding to the first target image. Examples of a ratio can be a clipping ratio or an image stretch ratio.

Figure 3:
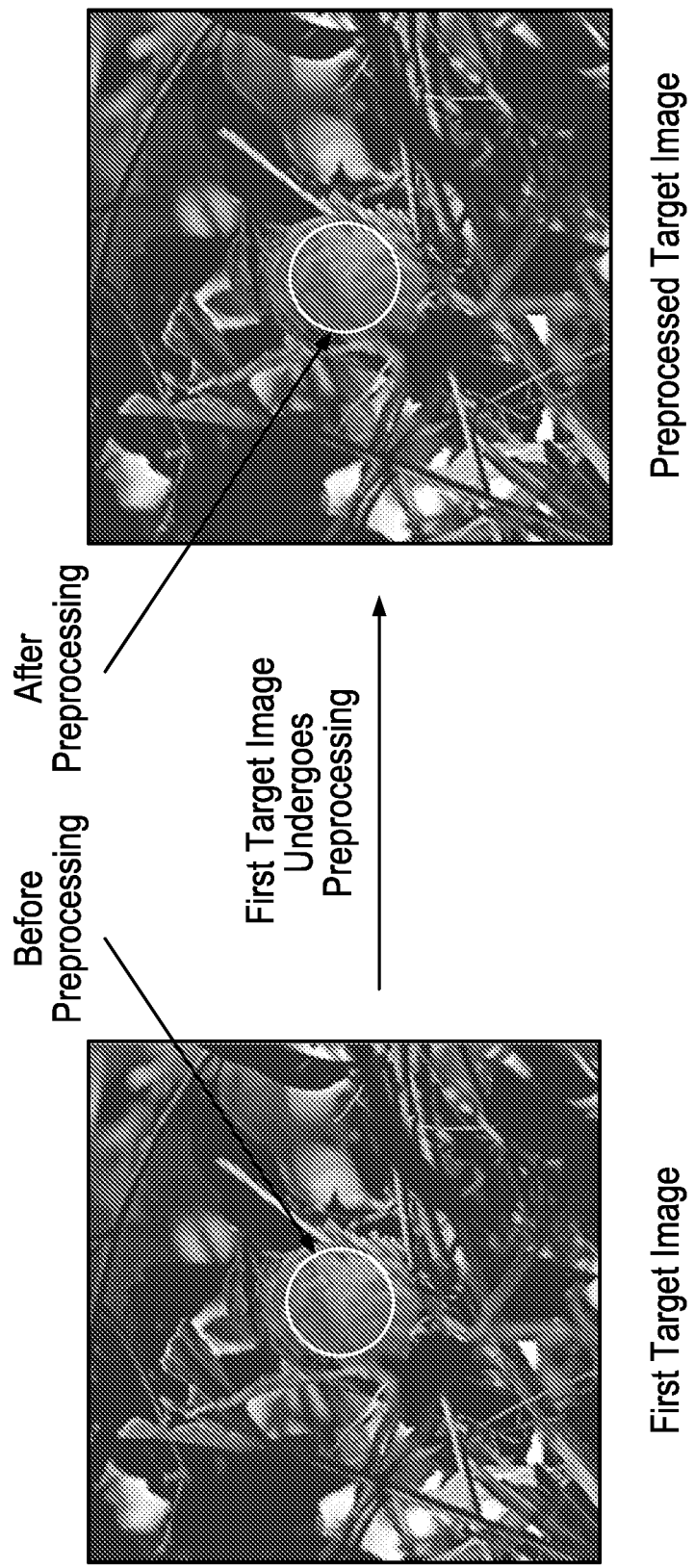
FIG. 3 is a diagram of an example of a process for preprocessing a first target image.

The preprocessing of the first target image to acquire a preprocessed target image corresponding to the first target image includes: subjecting the first target image to Gaussian smoothing to acquire a preprocessed, smoothed target image corresponding to the first target image. In other words, to eliminate Gaussian noise from the first target image, the first target image undergoes Gaussian smoothing. Gaussian smoothing is a type of linear smoothing filter processing used to eliminate Gaussian noise. Gaussian noise is statistical noise having a probability density function corresponding to that of the normal distribution. The subjecting of the first target image to Gaussian smoothing refers to subjecting pixels in the first target image to weighted average processing. The value of each pixel point in a processed first target image results from subjecting the pixel point itself and the other pixel values in the area adjacent to the pixel point to weighted averaging. The weighted average is the sum of each of the other pixel values in the area adjacent to the pixel point multiplied by its weight, then divided by the sum of the weights. FIG. 3 is a diagram of an example of a process for preprocessing a first target image. In some embodiments, Gaussian smoothing of the first target image includes: scanning each pixel in the first target image using a convolution or mask, and substituting for the value of the pixel point using the weight-averaged grayscale value of pixels in the area adjacent to each pixel as determined by the convolution or mask.

After the preprocessed target image corresponding to the first target image is obtained, edge target images corresponding to the preprocessed target image can be determined. In some embodiments, the preprocessed target image is processed using a corresponding edge detection operator to obtain edge target images as a result. The edge detection operator can correspond to a Sobel operator, a Laplacian operator, a Canny operator, or a Rebort operator.

Figure 4:
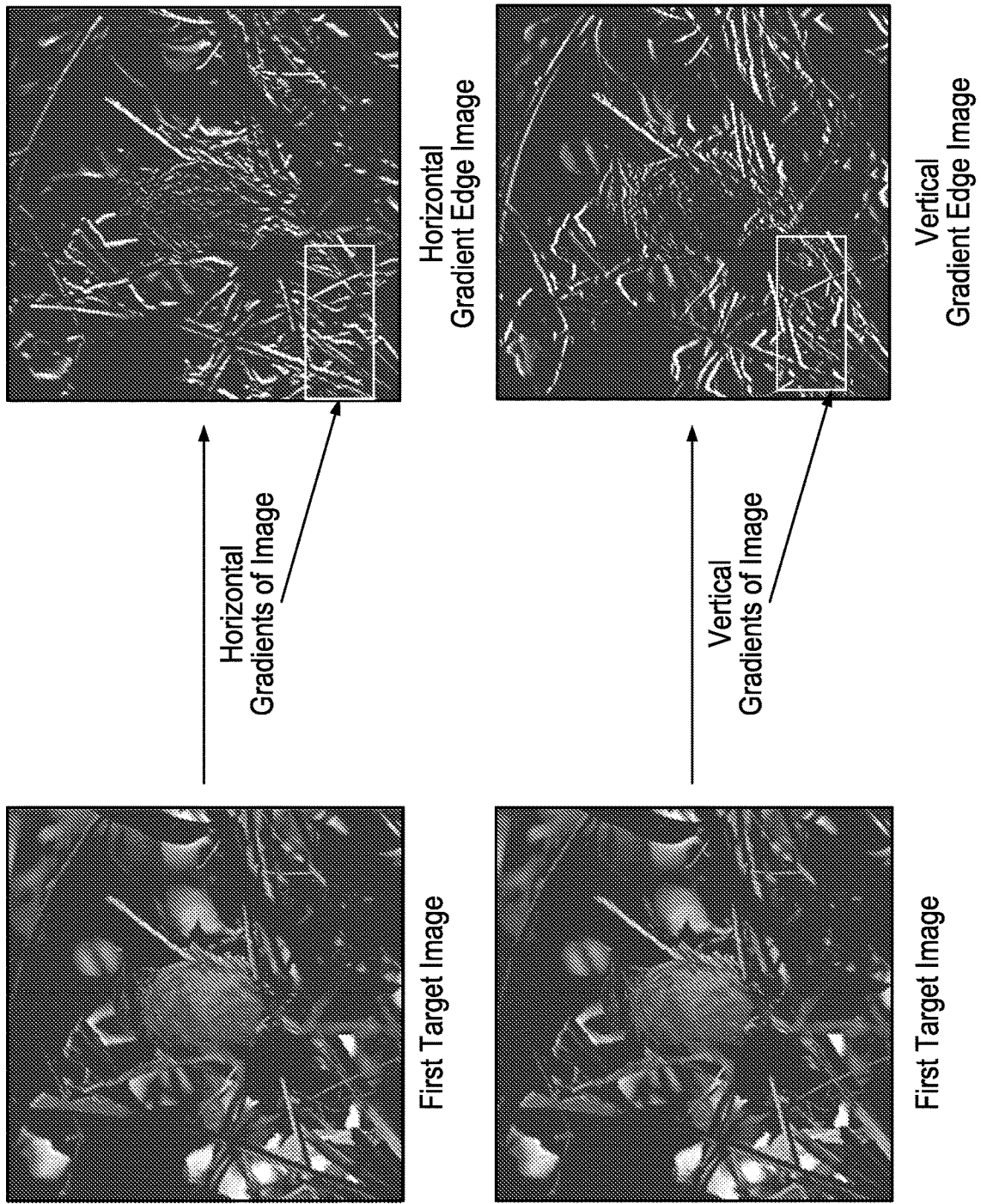
FIG. 4 is a diagram of examples of edge target images corresponding to a first target image.

FIG. 4 is a diagram of examples of edge target images corresponding to a first target image. The examples of the edge target images correspond to a horizontal gradient edge image Gx and a vertical gradient edge image Gy obtained by using the Sobel operator on the preprocessed image. Please note that the Sobel operator is an example of a pixel image edge detection operator. The Sobel operator can be used in machine learning, digital media, computer vision, and other information technology fields. From a technical perspective, the Sobel operator is a discrete, first-difference operator used to calculate first-order gradient approximate values of image luminance functions. A gradient vector corresponding to the point or a normal vector of the point can be generated using the Sobel operator on any point in an image. The horizontal gradient edge image Gx can be obtained by multiplying a pixel matrix of the preprocessed target image with the matrix $$\begin{pmatrix} -1 & 0 & 1 \\ -2 & 0 & 2 \\ -1 & 0 & 1 \end{pmatrix}.$$

The vertical gradient edge image Gy can be obtained by multiplying the pixel matrix of the preprocessed target image with the matrix $$\begin{pmatrix} 1 & 2 & 1 \\ 0 & 0 & 0 \\ -1 & -2 & -1 \end{pmatrix}.$$

The above two matrices shown can correspond with the matrices used in the Sobel operator.

After the edge target images corresponding to the preprocessed target images are obtained, a binary edge image corresponding to the first target image can be obtained using the edge target images.

Figure 5:
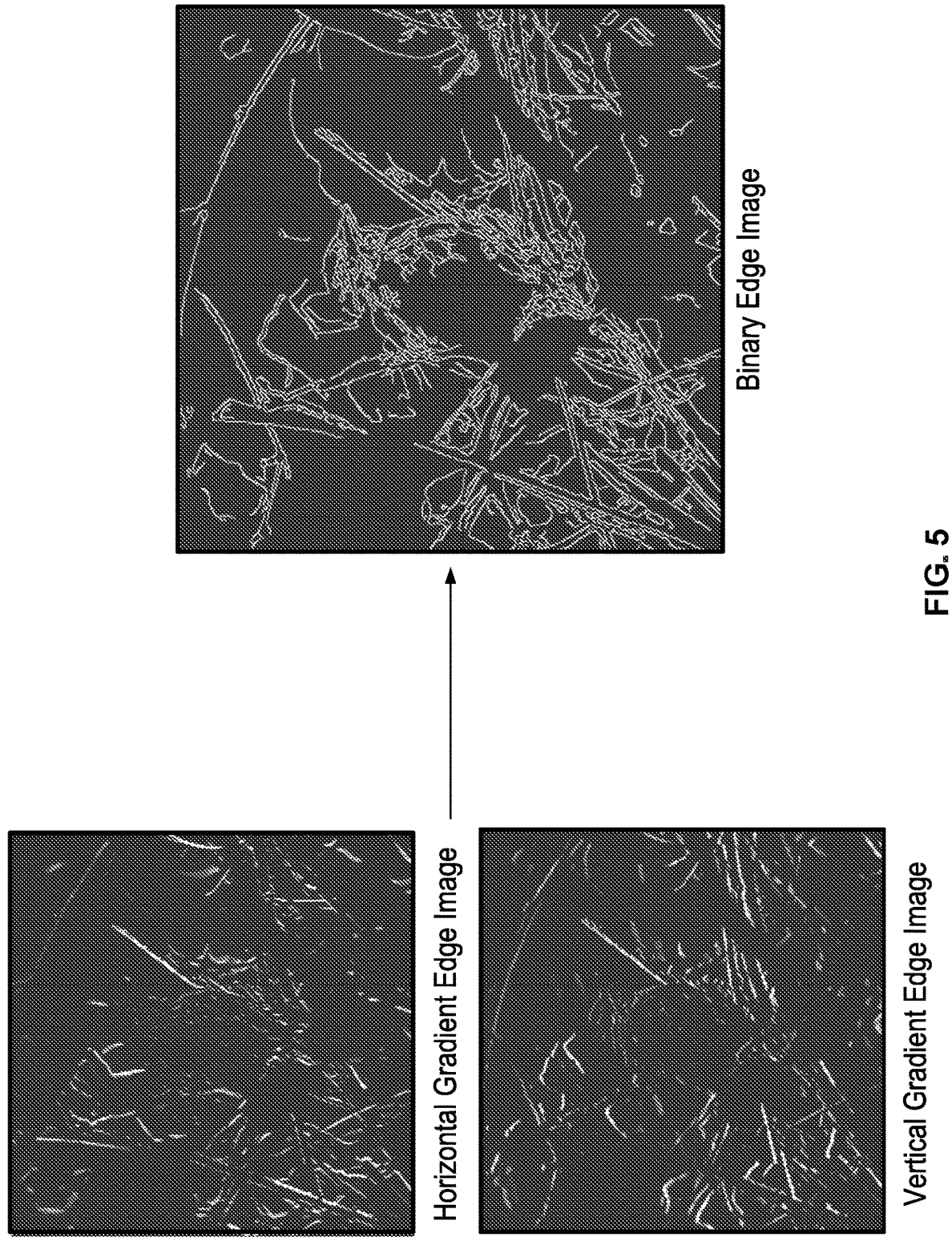
FIG. 5 is a diagram of an example of a binary edge image corresponding to a first target image.

FIG. 5 is a diagram of an example of a binary edge image corresponding to a first target image. After the horizontal gradient edge image Gx and the vertical gradient edge image Gy corresponding to the preprocessed target image are obtained using the Sobel operator, the horizontal gradient edge image Gx and the vertical gradient edge image Gy can be processed using an edge detection operator to acquire a binary edge image corresponding to the first target image. In some embodiments, the binary edge image refers to a binary image where pixels located at texture edges in an image have a value of 255 and pixels located in smooth areas have a value of 0. In some embodiments, the value of pixels located at texture edges is 1, while the value of pixels in smooth areas is 0. No restriction on the value of edge pixels and the value of smooth pixels is imposed here. In this example, the edge detection operator corresponds to the Canny operator. Other techniques can be used to obtain a binary edge image corresponding to the first target image. For example, a difference edge detection technique can be used to obtain a binary edge image corresponding to the first target image, and will not be further discussed for conciseness.

As shown in FIGS. 4 and 5, with the above examples, a binary edge image that corresponds to the first target image and that includes overall texture edge information in the first target image can be obtained. The binary edge image can visually present complex texture areas in the first target image.

Referring back to FIG. 2B, in some embodiments, in 2220, the acquiring of the second target image corresponding to the first target image can be performed based on the binary edge image and the low-luminance information image.

After the binary edge image corresponding to the first target image is obtained, a low-luminance binary edge image corresponding to the first target image can be acquired based on the binary edge image and the low-luminance information image that corresponds to the first target image.

Figure 6:
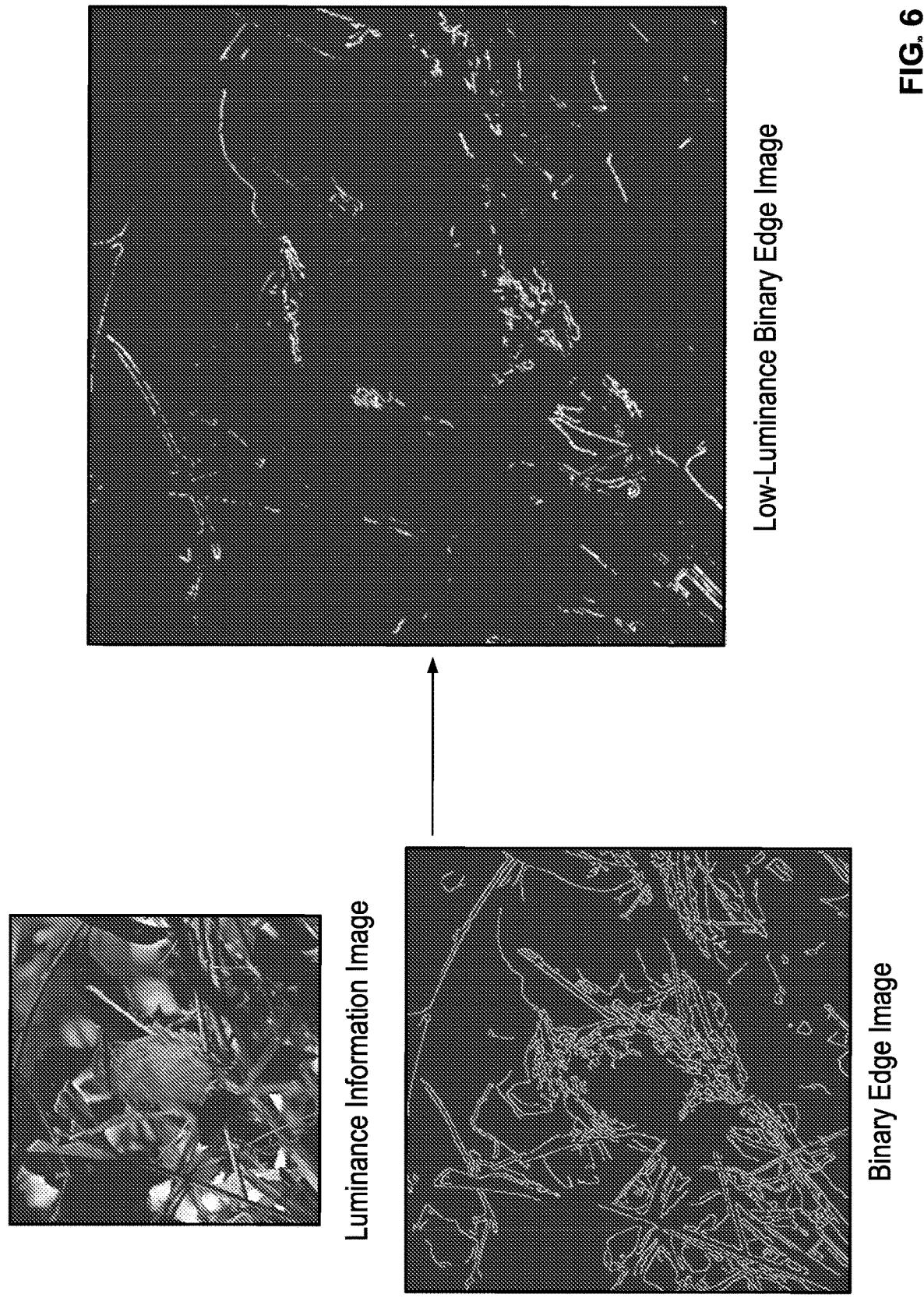
FIG. 6 is a diagram of an example of a low-luminance binary edge image corresponding to a first target image.

FIG. 6 is a diagram of an example of a low-luminance binary edge image corresponding to a first target image. The acquiring of a low-luminance binary edge image corresponding to a first target image based on the binary edge images and the low-luminance information image that corresponds to the first target image includes: matching image data in the low-luminance information image to image data in the binary edge images to obtain a low-luminance binary edge image. In some embodiments, the low-luminance binary edge image includes overall low-luminance texture edge information of the first target image. In other words, pixels in the binary edge image having a luminance higher than a luminance threshold value can be discarded and pixels not having a luminance higher than the luminance threshold value can be retained to obtain the low-luminance binary edge image.

At this point, a low-luminance binary edge image corresponding to the first target image is obtained. Subsequently, a target embedding position for to-be-embedded information in the first target image can be acquired based on the low-luminance binary edge image.

Referring back to FIG. 2A, in 230, the server selects candidate image areas from the second target image and determines a target embedding position for the to-be-embedded information in the first target image based on the candidate image areas.

To reduce the computational work involved in the embedding process while also being able to select a target embedding position for the to-be-embedded information based on content characteristics of the first target image, the server can select candidate areas corresponding to the to-be-embedded information in a low-luminance target image corresponding to the first target image (i.e., the low-luminance binary edge image) and acquire the target embedding position for the to-be-embedded information in the first target image based on comprehensive measurements of image texture information and luminance information in the candidate image areas.

In some embodiments, an adaptive multi-resolution decomposition scanning technique is used to select the target embedding position for to-be-embedded watermark information from the low-luminance binary edge image corresponding to the first target image. In some embodiments, the adaptive multi-resolution decomposition scanning technique is performed as follows: first, the server sets up a sliding window for selecting candidate image areas in the low-luminance binary edge image; and next, the server selects, using the sliding window, the candidate image areas by scanning the low-luminance binary edge image.

In some embodiments, the sliding window corresponds to a window which, by sliding within the image, selects candidate image areas of the same size and dimensions as the window itself. The receptive field of the sliding window corresponds to a cube of N dimensions. In other words, the sliding window can simply be regarded as a cube of N dimensions. The receptive field of the sliding window refers to the extent of the receptive range of the sliding window vis-à-vis the image or the mapping region of the sliding window within the image. In addition, the length and width of the sliding window can be based on the dimensions of the to-be-embedded information.

The selecting of the candidate image areas by scanning in the low-luminance target image using the sliding window includes: in the low-luminance binary edge image corresponding to the first target image, the sliding window can be slid based on the set step size of the sliding window to select the candidate image areas.

The step size of the sliding window relates to a sliding distance of each slide of the window. In some embodiments, to more precisely select the target embedding position for the to-be-embedded information in the first target image, the length and width values of the sliding window can be set to correspond to the step size of the sliding window. For example, in the event that the length and width of the sliding window are 20 mm×10 mm, the corresponding step size is to also be set to 20 mm×10 mm.

Figure 7:
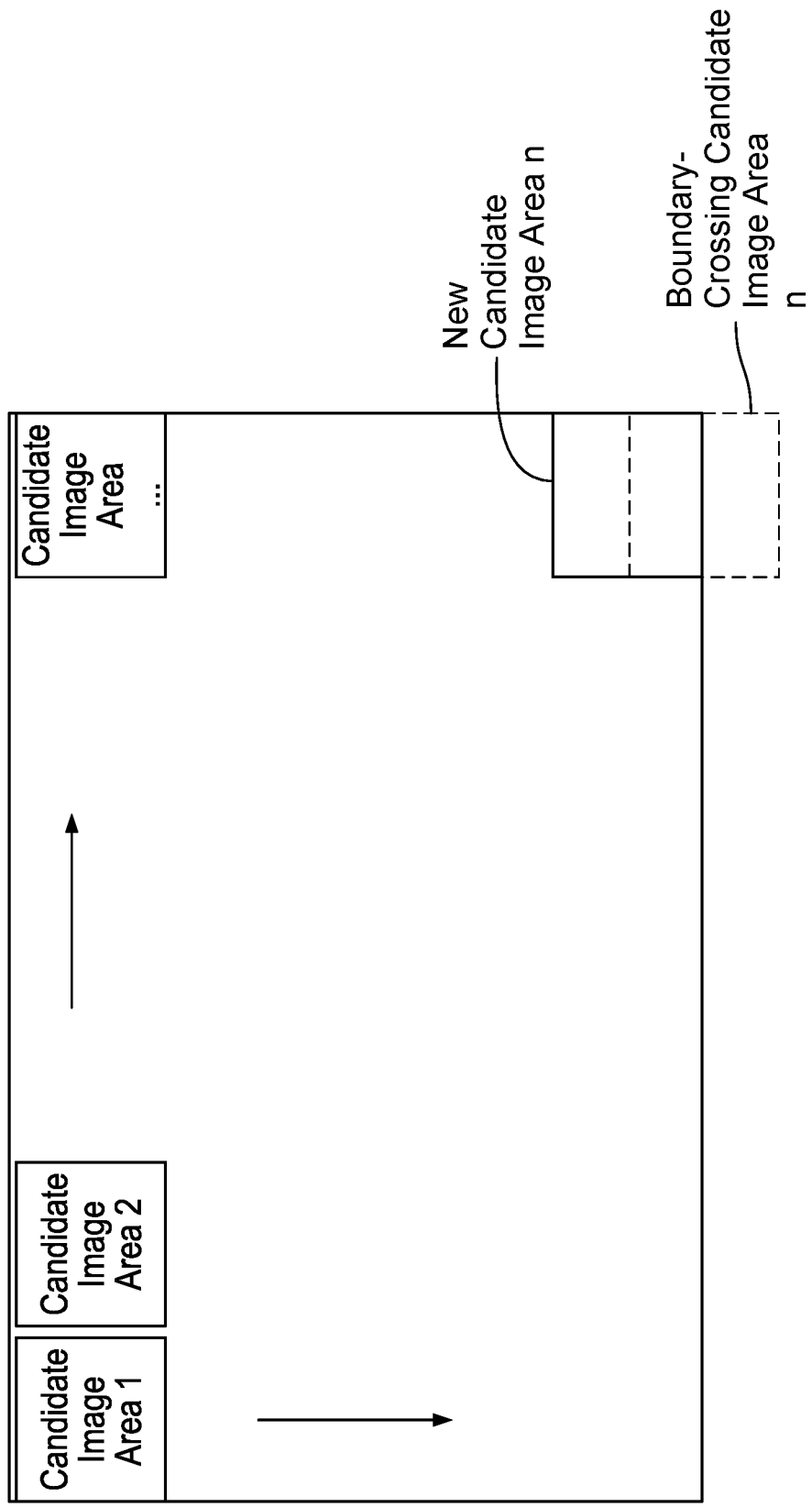
FIG. 7 is a diagram of an example of candidate image areas selected with a sliding window in a second target image.

FIG. 7 is a diagram of an example of candidate image areas selected with a sliding window in a second target image. As an example, not all low-luminance binary edge images have dimensions that are divisible by the window. In other words, the dimensions of a low-luminance binary edge image may not be set as an integral multiple of the dimensions of the sliding window. As an aspect, in the event that a sliding window slides to the boundary of a low-luminance binary edge image and a candidate image area is selected at the boundary, the candidate image area in this case can extend beyond the boundary of the low-luminance binary edge image. For example, in the event that the sliding range of the sliding window extends beyond the boundary of the low-luminance binary edge image, a new candidate image area is selected extending from the position where the boundary was crossed to the interior of the low-luminance binary edge image, and the new candidate image area is regarded as a candidate image area for the boundary position. As shown in FIG. 7, in the event that a candidate image area extends beyond the lower boundary of the image, a new candidate image area is made by reversing the direction, i.e., from the lower boundary position where the boundary was crossed towards the interior.

In some embodiments, to increase the speed and efficiency with which the target embedding position is obtained, when using the sliding window to select candidate image areas in a low-luminance binary edge image corresponding to the first target image, the sliding selection technique does not need to be employed, and instead, the low-luminance binary edge image is partitioned, simultaneously and in parallel, into at least one candidate image area. In some embodiments, in the partitioning technique, the candidate image areas match the dimensions of the sliding window. Moreover, the process of selecting candidate image areas at the boundary of the low-luminance binary edge image corresponds to the above sliding selection technique, and will not be further discussed for conciseness.

After the candidate image areas are selected from the low-luminance binary edge image, the target embedding position for the to-be-embedded information can be determined in the first target image based on the candidate image areas. In some embodiments, the determining of the target embedding position includes: first, calculating sums of edge values in the candidate image areas; and next, determining the target embedding position for the to-be-embedded watermark information in the target image based on the edge value sums corresponding to the candidate image areas.

In other words, after selecting one candidate image area using the sliding window in the low-luminance binary edge image or selecting, in parallel, multiple candidate image areas using the sliding window in the low-luminance binary edge image, the sums of pixel values at texture edges in each candidate image area can be calculated and then the candidate image area having the largest texture edge pixel value sum can be regarded as the target embedding position for to-be-embedded information in the first target image. For example, in the event that a low-luminance binary edge image includes six candidate image areas, the pixel values in each candidate image area are 255 and 0, 1 and 0, or other binary information. Thus, the sum corresponding to each candidate image area can be determined by summing the texture edge area pixel values in each candidate image area. Next, the target embedding position for the to-be-embedded information can be determined in the first target image by comparing the magnitudes of the six edge value sums. For example, the edge value sum corresponding to candidate image area 3 is the largest. Thus candidate image area 3 can be regarded as the target embedding position for to-be-embedded watermark information in the first target image.

Figure 8:
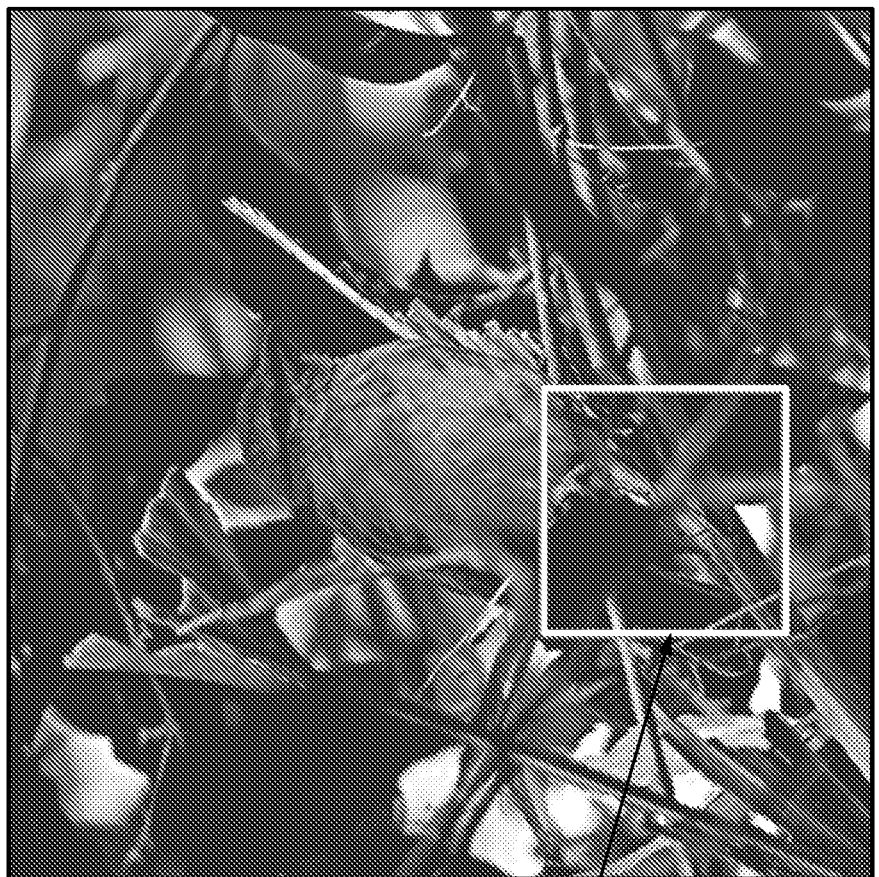
FIG. 8 is a diagram of an example of a target embedding position in a first target image.

FIG. 8 is a diagram of an example of a target embedding position in a first target image. Please note that one of the reasons for selecting the candidate image area including the largest edge data sum as the target embedding position for to-be-embedded information in the first target image is that, because visually expressing the overall texture edge information and low-luminance area information in the first target image through the low-luminance binary edge image corresponding to the first target image, the candidate image area having the largest edge data sum within the low-luminance binary edge image is often the area having texture information being the most complex within the first target image and having luminance information less than or equal to a luminance threshold value. Moreover, this technique is not affected by the resolution of the first target image. Embedding the to-be-embedded information in the selected area provides a higher level of secrecy, and the embedded information is less easily destroyed.

The technique for selecting a target embedding position for to-be-embedded information in a first target image is described above. In some embodiments, the target embedding position for the to-be-embedded information in the first target image can be selected by another technique, and will not be further discussed.

Referring back to FIG. 2A, in 240, the server embeds the to-be-embedded information in the target embedding position of the first target image.

Figure 9:
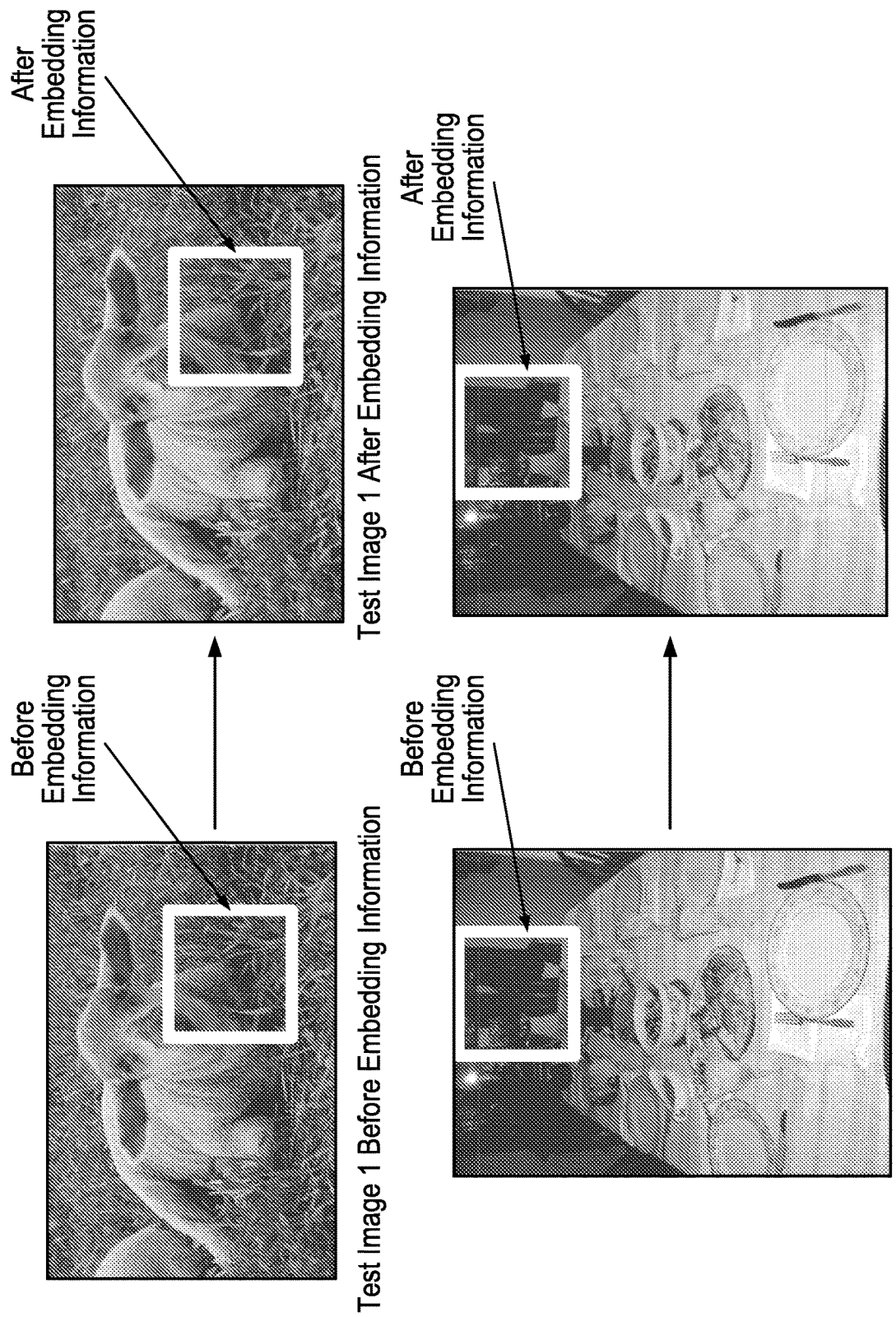
FIG. 9 is a diagram of an example of different target images before and after watermark embedding.

FIG. 9 is a diagram of an example of different target images before and after watermark embedding. As shown in FIG. 9, in the event that the process 200 of FIG. 2A is used to embed information in an image, no apparent difference in the target embedding position before and after information is embedded exists. Thus, the embedded information can be hidden more effectively.

To summarize, process 200 of FIG. 2A includes: acquiring a first target image to be embedded with information and to-be-embedded information; acquiring a second target image corresponding to the first target image using the first target image, the second target image being an image including low-luminance pixels in the first target image, the low-luminance pixels being pixels having a luminance no higher than a luminance threshold value in the first target image; selecting candidate image areas from the second target image and determining the target embedding position for the to-be-embedded information in the first target image based on candidate image areas; and embedding the to-be-embedded information in the target embedding position of the first target image. Process 200 avoids having to subject the first target image to voluminous calculations and performs embedding processing with reduced computational work and complexity and a shorter time period. At the same time, candidate image areas are selected in a second target image corresponding to the first target image, and a target embedding position for the to-be-embedded information is determined based on the candidate image areas. In other words, the embedding position for the to-be-embedded information is determined based on the geometric optics of the first target image itself. Thus, by taking into account the content characteristics of the first target image itself and an embedding position or strategy whereby information cannot be easily located through analysis, process 200 reduces the likelihood that the information is to be destroyed.

Figure 10:
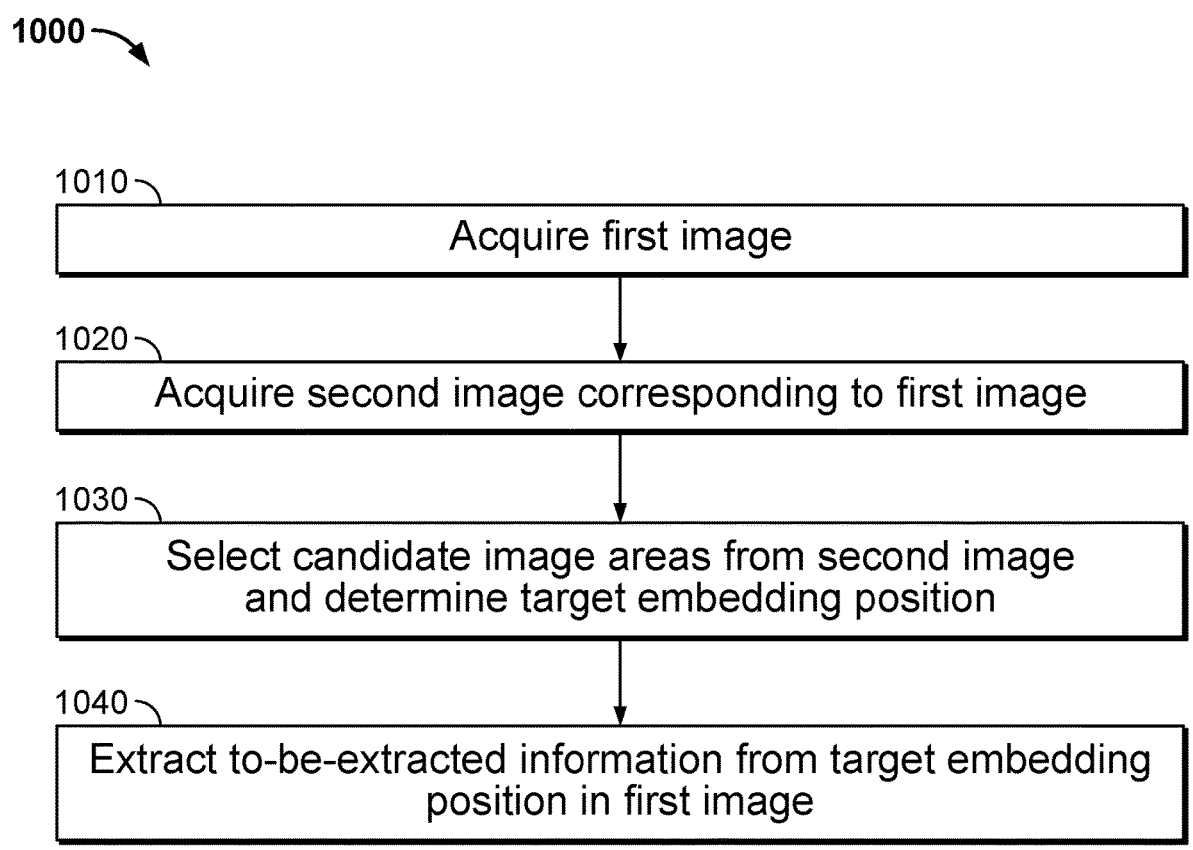
FIG. 10 is a flowchart of another embodiment of a process for data processing.

The process 200 of FIG. 2A was provided in the description above. Another embodiment of a process for data processing is disclosed. Some of the operations to be discussed have already been described with respect to process 200, and will not be further discussed for conciseness. FIG. 10 is a flowchart of another embodiment of a process for data processing. In some embodiments, the process 1000 is implemented by a server 100 of FIG. 1 and comprises:

In 1010, the server acquires a first image. In some embodiments, the first image includes to-be-extracted information.

In 1020, the server acquires, using the first image, a second image corresponding to the first image. In some embodiments, the second image corresponds to an image including low-luminance pixels in the first image. In some embodiments, the low-luminance pixels are pixels having a luminance no higher than a luminance threshold value in the first image.

In 1030, the server selects candidate image areas from the second image, and determines a target embedding position for the to-be-extracted information in the first image based on the candidate image areas.

In 1040, the server extracts the to-be-extracted information from the target embedding position in the first image. In some embodiments, the to-be-extracted information corresponds to an embedded watermark image.

Figure 11:
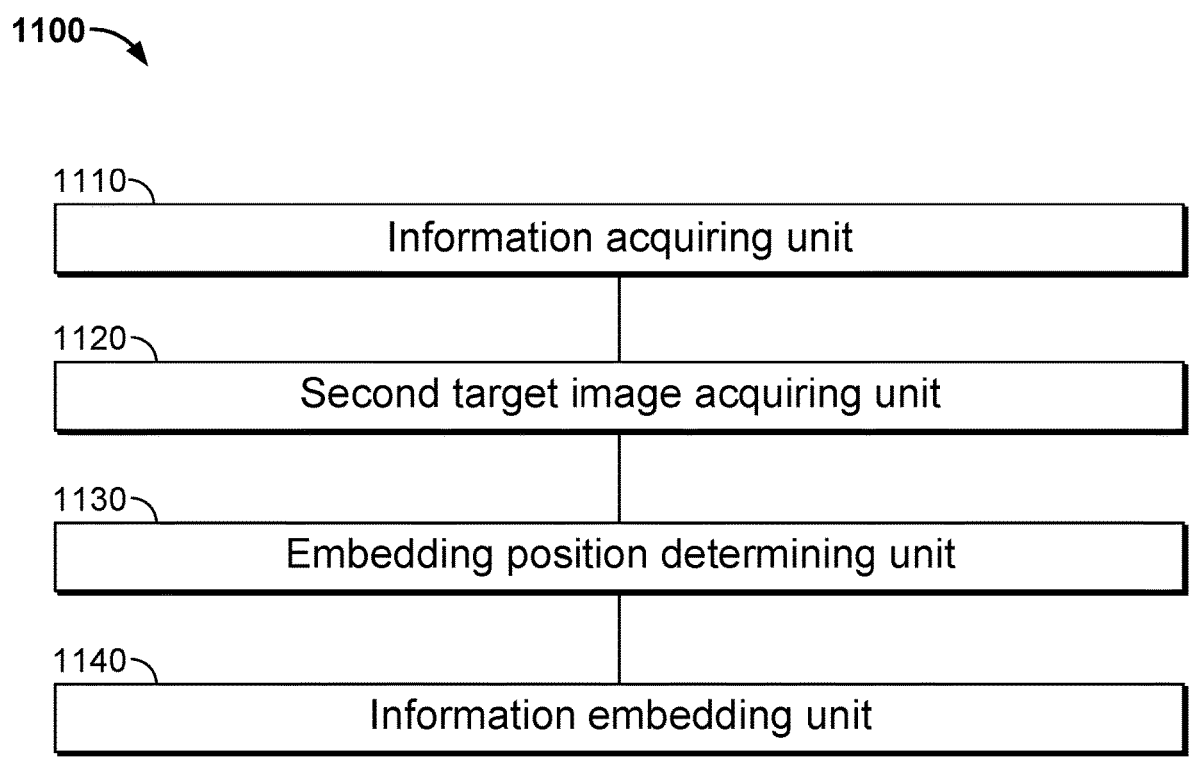
FIG. 11 is a diagram of an embodiment of a device for data processing.

FIG. 11 is a diagram of an embodiment of a device for data processing. In some embodiments, the device 1100 is configured to implement process 200 of FIG. 2A and comprises: an information acquiring unit 1110, a second target image acquiring unit 1120, an embedding position determining unit 1130, and an information embedding unit 1140.

In some embodiments, the information acquiring unit 1110 is configured to acquire a first target image to be embedded with information and to-be-embedded information.

In some embodiments, the second target image acquiring unit 1120 is configured to acquire, using the first target image, a second target image corresponding to the first target image, the second target image being an image including low-luminance pixels in the first target image, the low-luminance pixels being pixels having a luminance no higher than a luminance threshold value in the first target image.

In some embodiments, the embedding position determining unit 1130 is configured to select candidate image areas from the second target image and determine a target embedding position for the to-be-embedded information in the first target image based on the candidate image areas.

In some embodiments, the information embedding unit 1140 is configured to embed the to-be-embedded information in the target embedding position in the first target image.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

Figure 12:
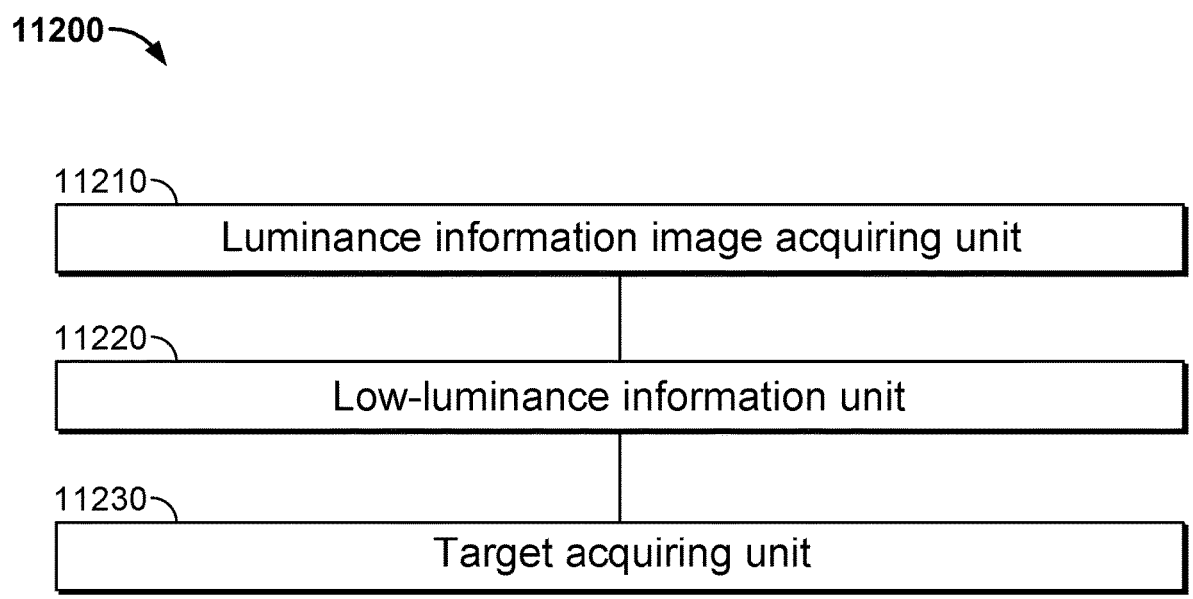
FIG. 12 is a diagram of an embodiment of a target image acquiring unit.

FIG. 12 is a diagram of an embodiment of a target image acquiring unit. In some embodiments, the target image acquiring unit 11200 is an implementation of the second target image acquiring unit 1120 of FIG. 11 and comprises: a luminance information image acquiring unit 11210, a low-luminance information unit 11220, and a target acquiring unit 11230.

In some embodiments, the luminance information image acquiring unit 11210 is configured to acquire a luminance information image having pixel luminance information and corresponding to the first target image;

In some embodiments, the low-luminance information unit 11220 is configured to discard pixels having a luminance higher than the luminance threshold value in the luminance information image to acquire a low-luminance information image corresponding to the luminance information image.

In some embodiments, the target acquiring unit 11230 is configured to acquire a second target image corresponding to the first target image based on the first target image and the low-luminance information image.

Figure 13:
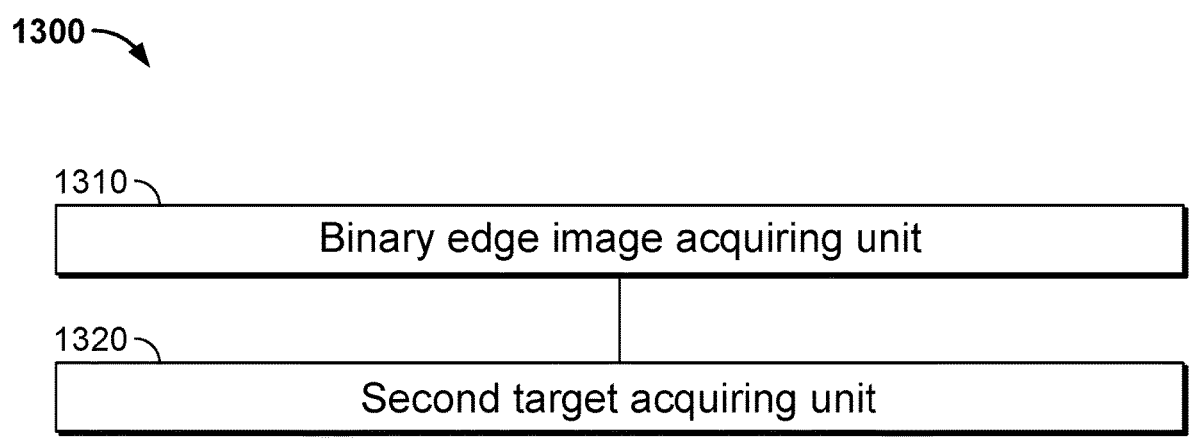
FIG. 13 is a diagram of another embodiment of a target image acquiring unit.

FIG. 13 is a diagram of another embodiment of a target image acquiring unit. In some embodiments, the target image acquiring unit 1300 is an implementation of the second target image acquiring unit 1120 of FIG. 11 and comprises: a binary edge image acquiring unit 1310 and a second target acquiring unit 1320.

In some embodiments, the binary edge image acquiring unit 1310 is configured to acquire a binary edge image corresponding to the first target image, the binary edge image being a binary image including overall texture edge information of the first target image.

In some embodiments, the second target acquiring unit 1320 is configured to acquire a second target image corresponding to the first target image based on the binary edge image and the low-luminance information image.

In some embodiments, the acquiring of the second target image corresponding to the first target image based on the binary edge image and the low-luminance information image comprises: matching image data in the low-luminance information image to image data in the binary edge image to acquire a low-luminance binary edge image including overall low-luminance texture edge information of the first target image.

Figure 14:
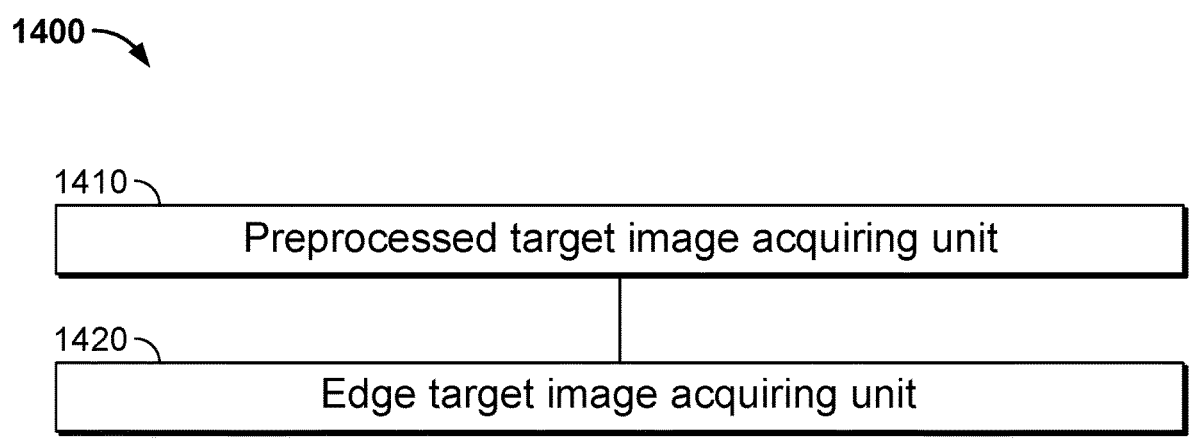
FIG. 14 is a diagram of an embodiment of a binary edge image acquiring unit.

FIG. 14 is a diagram of an embodiment of a binary edge image acquiring unit. In some embodiments, the binary edge image acquiring unit 1400 is an implementation of the binary edge image acquiring unit 1310 of FIG. 13 and comprises: a preprocessed target image acquiring unit 1410 and an edge target image acquiring unit 1420.

In some embodiments, the preprocessed target image acquiring unit 1410 is configured to preprocess the first target image to acquire a preprocessed target image corresponding to the first target image.

In some embodiments, the edge target image acquiring unit 1420 is configured to acquire, based on the preprocessed target image, edge target images corresponding to the preprocessed target image.

Referring back to FIG. 11, in some embodiments, the selecting of the candidate image areas from the second target image comprises:

setting up a sliding window for selecting the candidate image areas in the low-luminance binary edge image; and selecting, using the sliding window, the candidate image areas in the low-luminance binary edge image.

In some embodiments, the selecting of the candidate image areas from the second target image includes:

in the low-luminance binary edge image, sliding the sliding window according to the step size of the sliding window to select the candidate image areas in the low-luminance binary edge image.

In some embodiments, the selecting of the candidate image areas from the second target image using the sliding window further includes:

if, in the event that the sliding window is slid according to the step size of the sliding window, the sliding range of the sliding window extends beyond a boundary position of the low-luminance binary edge image, selecting a new candidate image area, extending from the position where the boundary was crossed to the interior of the low-luminance binary edge image, as the candidate image area for the boundary position.

In some embodiments, the selecting of the candidate image areas from the second target image using the sliding window further includes:

simultaneously partitioning the low-luminance binary edge image into at least one candidate image area, the dimensions of the candidate image area matching the dimensions of the sliding window.

Figure 15:
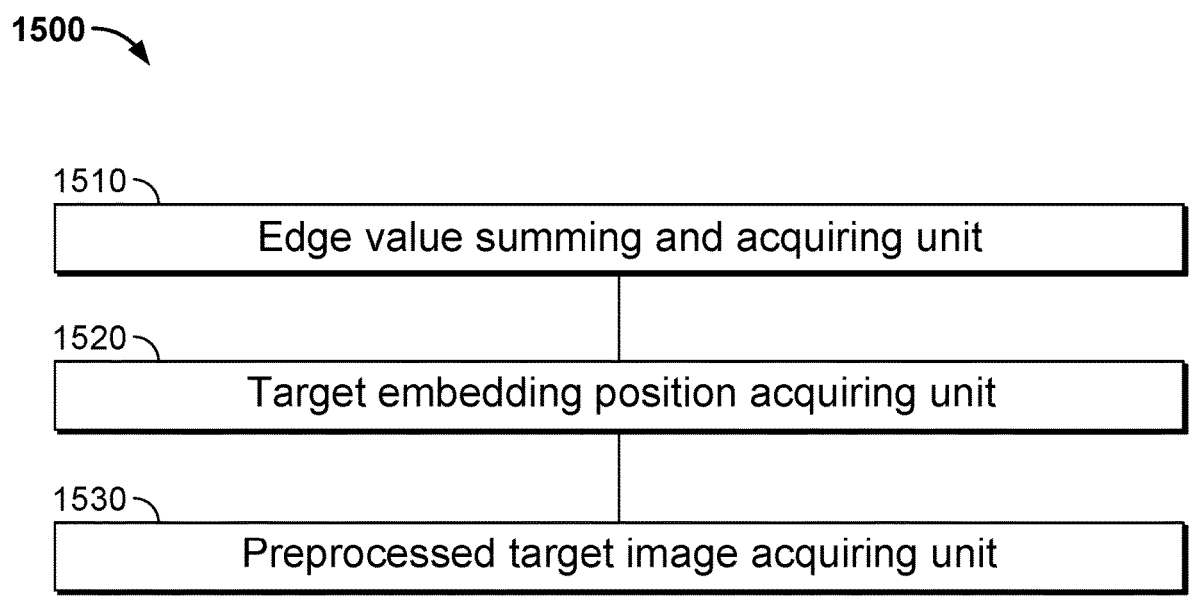
FIG. 15 is a diagram of an embodiment of an embedding position determining unit.

FIG. 15 is a diagram of an embodiment of an embedding position determining unit. In some embodiments, the embedding position determining unit 1500 is an implementation of the embedding position determining unit 1130 of FIG. 11 and comprises: an edge value summing and acquiring unit 1510, a target embedding position acquiring unit 1520, and a preprocessed target image acquiring unit 1530.

In some embodiments, the edge value summing and acquiring unit 1510 is configured to calculate sums of edge values in the candidate image areas and acquire edge value sums corresponding to the candidate image areas;

In some embodiments, the target embedding position acquiring unit 1520 is configured to determine a target embedding position for the to-be-embedded information in the first target image based on the edge value sums corresponding to the candidate image areas.

In some embodiments, the preprocessed target image acquiring unit 1530 is configured to acquire a preprocessed, smoothed target image corresponding to the first target image by subjecting the first target image to Gaussian smoothing.

Figure 16:
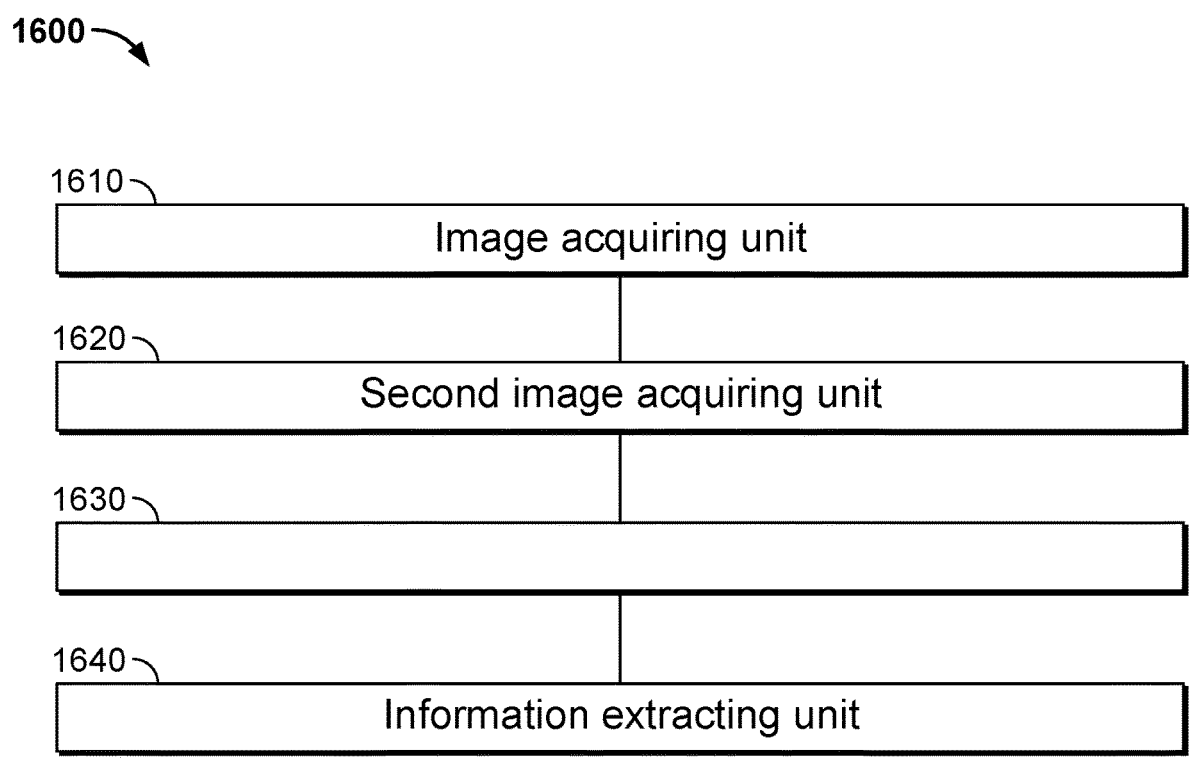
FIG. 16 is a diagram of another embodiment of a device for data processing.

FIG. 16 is a diagram of another embodiment of a device for data processing. In some embodiments, the device 1600 is configured to implement process 1000 of FIG. 10 and comprises: an image acquiring unit 1610, a second image acquiring unit 1620, an embedding position determining unit 1630, and an information extracting unit 1640.

In some embodiments, the image acquiring unit 1610 is configured to acquire a first image.

In some embodiments, the second image acquiring unit 1620 is configured to acquire, using the first image, a second image corresponding to the first image, the second image corresponding to an image including low-luminance pixels in the first image, the low-luminance pixels being pixels having a luminance no higher than a luminance threshold value in the second image.

In some embodiments, the embedding position determining unit 1630 is configured to select candidate image areas in the second image and determine the target embedding position of the to-be-extracted information in the first image based on the candidate image areas.

In some embodiments, the information extracting unit 1640 is configured to extract the to-be-extracted information from the target embedding position in the first image.

Figure 17:
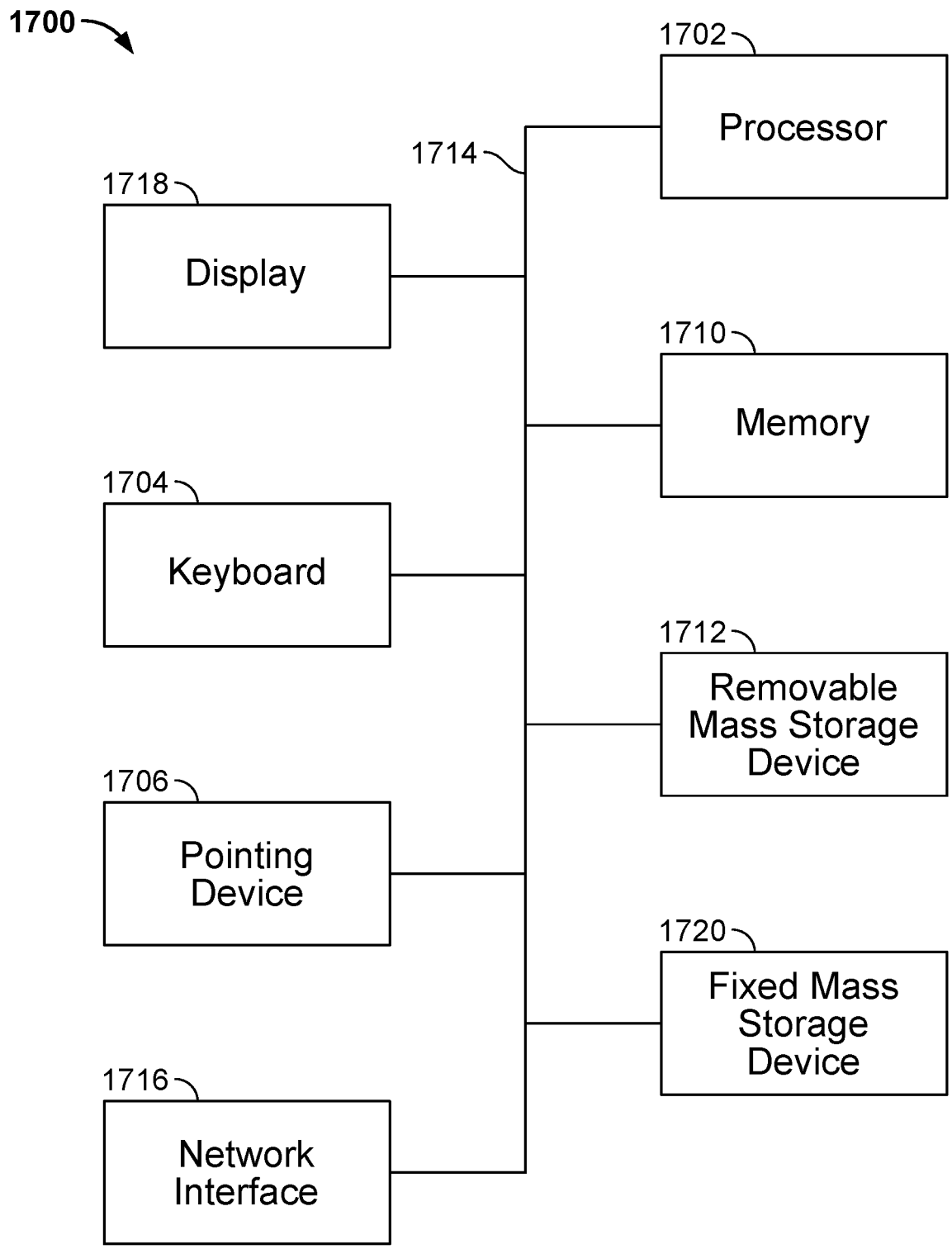
FIG. 17 is a functional diagram illustrating a programmed computer system for data processing in accordance with some embodiments.

FIG. 17 is a functional diagram illustrating a programmed computer system for data processing in accordance with some embodiments. As will be apparent, other computer system architectures and configurations can be used to perform data processing. Computer system 1700, which includes various subsystems as described below, includes at least one microprocessor subsystem (also referred to as a processor or a central processing unit (CPU)) 1702. For example, processor 1702 can be implemented by a single-chip processor or by multiple processors. In some embodiments, processor 1702 is a general purpose digital processor that controls the operation of the computer system 1700. Using instructions retrieved from memory 1710, the processor 1702 controls the reception and manipulation of input data, and the output and display of data on output devices (e.g., display 1718).

Processor 1702 is coupled bi-directionally with memory 1710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1702. Also as is well known in the art, primary storage typically includes basic operating instructions, program code, data, and objects used by the processor 1702 to perform its functions (e.g., programmed instructions). For example, memory 1710 can include any suitable computer-readable storage media, described below, depending on whether, for example, data access needs to be bi-directional or uni-directional. For example, processor 1702 can also directly and very rapidly retrieve and store frequently needed data in a cache memory (not shown).

A removable mass storage device 1712 provides additional data storage capacity for the computer system 1700, and is coupled either bi-directionally (read/write) or uni-directionally (read only) to processor 1702. For example, storage 1712 can also include computer-readable media such as magnetic tape, flash memory, PC-CARDS, portable mass storage devices, holographic storage devices, and other storage devices. A fixed mass storage 1720 can also, for example, provide additional data storage capacity. The most common example of mass storage 1720 is a hard disk drive. Mass storages 1712, 1720 generally store additional programming instructions, data, and the like that typically are not in active use by the processor 1702. It will be appreciated that the information retained within mass storages 1712 and 1720 can be incorporated, if needed, in standard fashion as part of memory 1710 (e.g., RAM) as virtual memory.

In addition to providing processor 1702 access to storage subsystems, bus 1714 can also be used to provide access to other subsystems and devices. As shown, these can include a display monitor 1718, a network interface 1716, a keyboard 1704, and a pointing device 1706, as well as an auxiliary input/output device interface, a sound card, speakers, and other subsystems as needed. For example, the pointing device 1706 can be a mouse, stylus, track ball, or tablet, and is useful for interacting with a graphical user interface.

The network interface 1716 allows processor 1702 to be coupled to another computer, computer network, or telecommunications network using a network connection as shown. For example, through the network interface 1716, the processor 1702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1702 can be used to connect the computer system 1700 to an external network and transfer data according to standard protocols. For example, various process embodiments disclosed herein can be executed on processor 1702, or can be performed across a network such as the Internet, intranet networks, or local area networks, in conjunction with a remote processor that shares a portion of the processing. Additional mass storage devices (not shown) can also be connected to processor 1702 through network interface 1716.

An auxiliary I/O device interface (not shown) can be used in conjunction with computer system 1700. The auxiliary I/O device interface can include general and customized interfaces that allow the processor 1702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 17 is but an example of a computer system suitable for use with the various embodiments disclosed herein. Other computer systems suitable for such use can include additional or fewer subsystems. In addition, bus 1714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   acquiring a first target image to be embedded with first information and to-be-embedded information;
   acquiring, using the first target image, a second target image corresponding to the first target image, wherein the second target image corresponds to an image including low-luminance pixels in the first target image, the low-luminance pixels being pixels in the first target image having a luminance no higher than a luminance threshold value, and wherein the acquiring of the second target image corresponding to the first target image comprises:
      acquiring a luminance information image including pixel luminance information and corresponding to the first target image;
      discarding pixels having a luminance higher than the luminance threshold value in the luminance information image to obtain a low-luminance information image corresponding to the luminance information image; and
      acquiring the second target image corresponding to the first target image based on the first target image and the low-luminance information image;
   selecting candidate image areas from the second target image;
   determining a target embedding position for the to-be-embedded information in the first target image based on the candidate image areas; and
   embedding the to-be-embedded information in the target embedding position in the first target image.

2. The method as described in claim 1, wherein the acquiring of the second target image corresponding to the first target image based on the first target image and the low-luminance information image comprises:
   acquiring a binary edge image corresponding to the first target image, the binary edge image corresponding to a binary image including overall texture edge information of the first target image; and
   acquiring the second target image corresponding to the first target image based on the binary edge image and the low-luminance information image.

3. The method as described in claim 2, wherein the acquiring of the binary edge image corresponding to the first target image comprises:
   preprocessing the first target image to obtain a preprocessed target image corresponding to the first target image;
   acquiring, using the preprocessed target image, an edge target image corresponding to the preprocessed target image; and
   acquiring the binary edge image corresponding to the first target image based on the edge target image.

4. The method as described in claim 2, wherein the acquiring of the second target image corresponding to the first target image comprises:
   matching image data in the low-luminance information image to image data in the binary edge image to obtain a low-luminance binary edge image including overall low-luminance texture edge information of the first target image.

5. The method as described in claim 4, wherein the selecting of the candidate image areas from the second target image comprises:
   setting up a sliding window for selecting the candidate image areas in the low-luminance binary edge image; and
   selecting, using the sliding window, the candidate image areas in the low-luminance binary edge image.

6. The method as described in claim 5, wherein the selecting of the candidate image areas comprises:
   in the low-luminance binary edge image, sliding the sliding window based on a step size of the sliding window to select the candidate image areas in the low-luminance binary edge image.

7. The method as described in claim 6, further comprising:
   in the event that, when the sliding window is slid according to the step size of the sliding window, a sliding range of the sliding window extends beyond a boundary position of the low-luminance binary edge image, selecting a new candidate image area extending from a position where a boundary was crossed to an interior of the low-luminance binary edge image, as a candidate image area for the boundary position.

8. The method as described in claim 5, wherein the selecting of the candidate image areas comprises:
   simultaneously partitioning the low-luminance binary edge image into at least one candidate image area, dimensions of the candidate image area matching dimensions of the sliding window.

9. A method, comprising:
   acquiring a first target image to be embedded with first information and to-be-embedded information;

acquiring, using the first target image, a second target image corresponding to the first target image, wherein the second target image corresponds to an image including low-luminance pixels in the first target image, the low-luminance pixels being pixels in the first target image having a luminance no higher than a luminance threshold value;

determining a target embedding position for the to-be-embedded information in the first target image based on the candidate image areas, wherein the determining of the target embedding position for the to-be-embedded information in the first target image comprises:

calculating sums of edge values in the candidate image areas to obtain edge value sums corresponding to the candidate image areas; and determining the target embedding position for the to-be-embedded information in the first target image based on the edge value sums corresponding to the candidate image areas; and embedding the to-be-embedded information in the target embedding position in the first target image.

10. The method as described in claim 3, wherein the preprocessing of the first target image to obtain the preprocessed target image corresponding to the first target image comprises:

subjecting the first target image to Gaussian smoothing to acquire a preprocessed, smoothed target image corresponding to the first target image.

11. The method as described in claim 1, wherein the luminance information image comprises one of the following: a luminance image corresponding to the first target image or a grayscale image corresponding to the first target image.

12. A method, comprising:

acquiring a first image, the first image including to-be-extracted information;

acquiring, using the first image, a second image corresponding to the first image, wherein the second image is an image including low-luminance pixels in the first image, the low-luminance pixels being pixels in the first image having a luminance no higher than a luminance threshold value, and wherein the acquiring of the second target image corresponding to the first target image comprises:

acquiring a luminance information image including pixel luminance information and corresponding to the first target image;

discarding pixels having a luminance higher than the luminance threshold value in the luminance information image to obtain a low-luminance information image corresponding to the luminance information image; and acquiring the second target image corresponding to the first target image based on the first target image and the low-luminance information image;

selecting candidate image areas from the second image;

determining a target embedding position for the to-be-extracted information in the first image based on the candidate image areas; and extracting the to-be-extracted information from the target embedding position in the first image.

13. A system, comprising:

a processor; and a memory coupled with the processor, wherein the memory is configured to provide the processor with instructions which when executed cause the processor to:

acquire a first target image to be embedded with first information and to-be-embedded information;

acquire, using the first target image, a second target image corresponding to the first target image, wherein the second target image corresponds to an image including low-luminance pixels in the first target image, the low-luminance pixels being pixels in the first target image having a luminance no higher than a luminance threshold value, and wherein the acquiring of the second target image corresponding to the first target image comprises to:

acquire a luminance information image including pixel luminance information and corresponding to the first target image;

discard pixels having a luminance higher than the luminance threshold value in the luminance information image to obtain a low-luminance information image corresponding to the luminance information image; and acquire the second target image corresponding to the first target image based on the first target image and the low-luminance information image;

select candidate image areas from the second target image;

determine a target embedding position for the to-be-embedded information in the first target image based on the candidate image areas; and embed the to-be-embedded information in the target embedding position in the first target image.

14. A system, comprising:

a processor; and a memory coupled with the processor, wherein the memory is configured to provide the processor with instructions which when executed cause the processor to:

acquire a first image, the first image including to-be-extracted information;

acquire, using the first image, a second image corresponding to the first image, wherein the second image is an image including low-luminance pixels in the first image, the low-luminance pixels being pixels in the first image having a luminance no higher than a luminance threshold value, and wherein the acquiring of the second target image corresponding to the first target image comprises to:

acquire a luminance information image including pixel luminance information and corresponding to the first target image;

discard pixels having a luminance higher than the luminance threshold value in the luminance information image to obtain a low-luminance information image corresponding to the luminance information image; and acquire the second target image corresponding to the first target image based on the first target image and the low-luminance information image;

select candidate image areas from the second image;

determine a target embedding position for the to-be-extracted information in the first image based on the candidate image areas; and extract the to-be-extracted information from the target embedding position in the first image.

15. A computer program product being embodied in a tangible non-transitory computer readable storage medium and comprising computer instructions for:

acquiring a first target image to be embedded with first information and to-be-embedded information;

acquiring, using the first target image, a second target image corresponding to the first target image, wherein the second target image corresponds to an image including low-luminance pixels in the first target image, the low-luminance pixels being pixels in the first target image having a luminance no higher than a luminance threshold value, and wherein the acquiring of the second target image corresponding to the first target image comprises:
- acquiring a luminance information image including pixel luminance information and corresponding to the first target image;
- discarding pixels having a luminance higher than the luminance threshold value in the luminance information image to obtain a low-luminance information image corresponding to the luminance information image; and
- acquiring the second target image corresponding to the first target image based on the first target image and the low-luminance information image;

selecting candidate image areas from the second target image;
determining a target embedding position for the to-be-embedded information in the first target image based on the candidate image areas; and
embedding the to-be-embedded information in the target embedding position in the first target image.

16. A computer program product being embodied in a tangible non-transitory computer readable storage medium and comprising computer instructions for:
acquiring a first image, the first image including to-be-extracted information;
acquiring, using the first image, a second image corresponding to the first image, wherein the second image is an image including low-luminance pixels in the first image, the low-luminance pixels being pixels in the first image having a luminance no higher than a luminance threshold value, and wherein the acquiring of the second target image corresponding to the first target image comprises:
- acquiring a luminance information image including pixel luminance information and corresponding to the first target image;
- discarding pixels having a luminance higher than the luminance threshold value in the luminance information image to obtain a low-luminance information image corresponding to the luminance information image; and
- acquiring the second target image corresponding to the first target image based on the first target image and the low-luminance information image;

selecting candidate image areas from the second image;
determining a target embedding position for the to-be-extracted information in the first image based on the candidate image areas; and
extracting the to-be-extracted information from the target embedding position in the first image.

17. A system, comprising:
a processor; and
a memory coupled with the processor, wherein the memory is configured to provide the processor with instructions which when executed cause the processor to:
- acquire a first target image to be embedded with first information and to-be-embedded information;
- acquire, using the first target image, a second target image corresponding to the first target image, wherein the second target image corresponds to an image including low-luminance pixels in the first target image, the low-luminance pixels being pixels in the first target image having a luminance no higher than a luminance threshold value;
- select candidate image areas from the second target image;
- determine a target embedding position for the to-be-embedded information in the first target image based on the candidate image areas, wherein the determining of the target embedding position for the to-be-embedded information in the first target image comprises to:
  - calculate sums of edge values in the candidate image areas to obtain edge value sums corresponding to the candidate image areas; and
  - determine the target embedding position for the to-be-embedded information in the first target image based on the edge value sums corresponding to the candidate image areas; and
- embed the to-be-embedded information in the target embedding position in the first target image.

18. A computer program product being embodied in a tangible non-transitory computer readable storage medium and comprising computer instructions for:
acquiring a first image, the first image including to-be-extracted information;
acquiring, using the first image, a second image corresponding to the first image, wherein the second image is an image including low-luminance pixels in the first image, the low-luminance pixels being pixels in the first image having a luminance no higher than a luminance threshold value;
selecting candidate image areas from the second image;
determining a target embedding position for the to-be-extracted information in the first image based on the candidate image areas, wherein the determining of the target embedding position for the to-be-embedded information in the first target image comprises:
- calculating sums of edge values in the candidate image areas to obtain edge value sums corresponding to the candidate image areas; and
- determining the target embedding position for the to-be-embedded information in the first target image based on the edge value sums corresponding to the candidate image areas; and extracting the to-be-extracted information from the target embedding position in the first image.

* * * * *